Nov. 26, 1963 G. A. DYER 3,112,412
DIRECT CURRENT THRESHOLD SIGNAL DETECTOR
Filed July 6, 1960
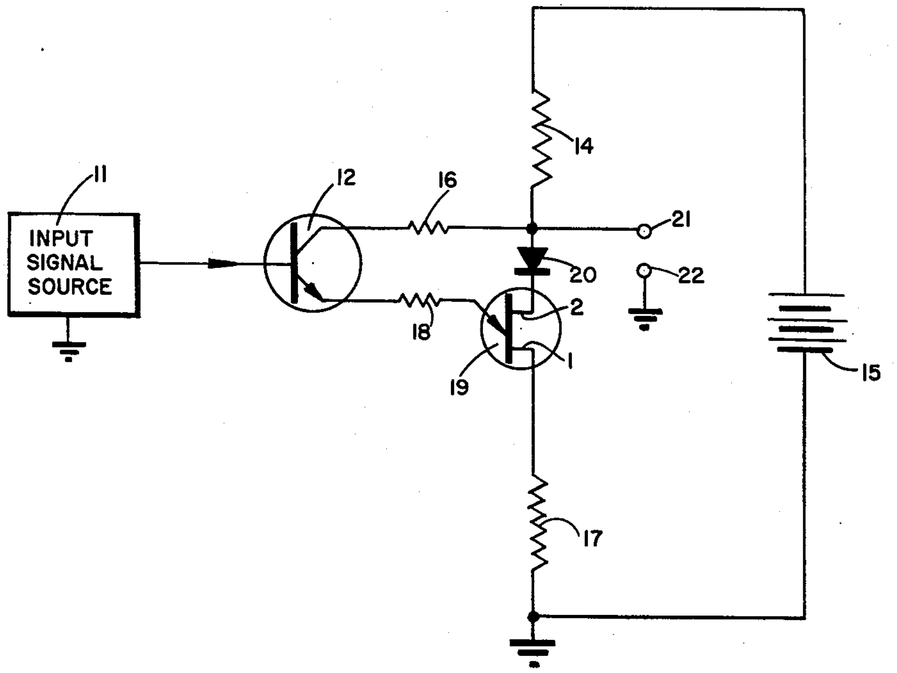
INVENTOR.
GEORGE A. DYER
BY Edward A. Sokolski
AGENT United States Patent Office 3,112,412
Patented Nov. 26, 1963

3,112,412
DIRECT CURRENT THRESHOLD SIGNAL DETECTOR

George A. Dyer, Garden Grove, Calif., assignor to North American Aviation, Inc.
Filed July 6, 1960, Ser. No. 41,065
10 Claims. (Cl. 307—88.5)

This invention is related to a direct current threshold signal detector and more particularly to such a comparator consistent in operation and readily reproducible in characteristics.

Accurate repeatable D.-C. threshold signal detectors are much in the demand in precision electronic equipment, especially in control circuitry where an output keying signal is desired when an input signal reaches a predetermined value. Such a circuit might be utilized, for example, in a fail-safe system in which it is desired to cut off the operation of a particular control device should a certain control voltage exceed specified amplitude limits. To accomplish this purpose, D.-C. regenerative circuits such as the Schmitt trigger are extensively used. The Schmitt trigger circuit which is a modified version of a multivibrator utilizes two transistor or vacuum tube type switches operating in multivibrator type configuration.

It is difficult, however, to design a Schmitt trigger to operate consistently at the same predetermined firing voltage with changes in temperature and with variations in the characteristics of the components utilized. The varying effect of the firing voltage with variations in the characteristics of the components used also poses a problem in obtaining identically operating units in the manufacture of a precision comparator device of the Schmitt trigger configuration. In many cases, components must be carefully selected, even where expensive high quality components are utilized, to get the desired results. In circuits utilizing vacuum tubes, these problems are generally not too severe, but where semiconductor devices are utilized, factors such as leakage, beta spread, and variations in characteristics with temperature changes, make the design and manufacture of a predictable comparator a difficult one.

The device of this invention provides a simple yet precise signal voltage threshold detector utilizing semiconductor elements which is consistent in characteristics without resort to the use of expensive components or to component selection. In the device of the invention, noncritical, inexpensive components can be utilized without sacrificing precision operation.

This end result is accomplished by combining a transistor and a double base diode in a regenerative feedback circuit. A minimum number of components are utilized in a circuit having a rapidly rising output signal in response to a D.-C. input in excess of a predetermined limit.

It is therefore an object of this invention to provide an improved direct current threshold signal detector circuit.

It is a further object of this invention to facilitate the manufacture of D.-C. threshold signal detector circuits.

It is still another object of this invention to provide a D.-C. signal threshold detector utilizing semiconductor switching units which is readily reproducible in characteristics.

It is still a further object of this invention to make possible the construction of a D.-C. signal threshold detector capable of precision operation without resort to the selection of components or to the use of expensive components.

It is still another object of this invention to provide a simple, inexpensive yet highly precise D.-C. signal threshold detector.

Other objects of this invention will become apparent from the following description taken in connection with the accompanying drawing which is a schematic representation of a preferred embodiment of the device of the invention.

The device of the invention has a transistor input stage which is utilized in a regenerative feedback circuit with a double base diode. Positive feedback is provided through the double base diode to the transistor and through the transistor to the double base diode, the two semiconductor devices operating in a regenerative feedback circuit to effect a rapid change of state of both semiconductors from the nonconduction to the conduction condition in response to an input signal in excess of a predetermined magnitude.

The double base diode is a semiconductor ohmic bar with an emitter junction placed near one of the base regions. Normally, the emitter is back biased and the injection of a voltage at the emitter of a sufficient magnitude will change the device from one having ohmic characteristics to one having a normal diode voltage drop. A detailed description of double base diodes can be found on pages 466 et seq., of Principles of Transistor Circuits by Richard Shea published by John Wiley & Sons in 1953.

Referring to the sole FIGURE which illustrates in schematic form a preferred embodiment of the device of the invention, the input signal is fed from input signal source 11 to the base of transistor 12. The emitter of transistor 12 is connected through resistor 18 to the emitter of double base diode 19. Base 1 (the lower base in the figure) of double base diode 19 is connected through resistor 17 to the negative terminal of power source 15 which is grounded. The collector of transistor 12 is connected through resistor 16 to the anode of diode 20. The cathode of diode 20 is connected to the base 2 (the upper base in the figure) of double base diode 19. Resistor 14 is connected between the anode of diode 20 and the positive terminal of power source 15. Output terminals 21 and 22 are connected to the anode of diode 20 and to ground respectively.

The illustrated embodiment of the device of the invention operates in the following manner: Transistor 12 and double base diode 19 are back biased by means of D.-C. power source 15 operating in conjunction with biasing resistors 14, 16, 17 and 18 so that they will not conduct until a predetermined voltage of a sufficient magnitude to overcome this back biasing is supplied from signal source 11 to the base of transistor 12. The output of power source 15 and the values of resistors 14, 16, 17, and 18 are selected to produce the necessary back biasing for transistor 12 and double base diode 19 so that a particular desired magnitude of input voltage from input signal source 11 will fire the transistor and the double base diode. Thus, a particular positive voltage is established as the critical firing voltage for the circuit.

Initially, double base diode 19 appears as a high resistance in the resistive network across D.-C. power source 15. As the voltage from input signal source 11 increases, this voltage will appear at the emitter of diode 19 causing a small amount of diode conduction across this junction. This will tend to lower the voltage at the emitter of transistor 12. When the voltage from input signal source 11 applied to the base of transistor 12 becomes slightly higher than the voltage at the emitter of this transistor, current will begin to flow through the transistor. This current flow will cause the voltage at the anode of diode 20 and at the upper base (base 2) of double base diode 19 to drop in view of the voltage drop across resistor 14 which is connected between power source 15 and the collector of transistor 12. This drop in potential at the upper base of double base diode 19, coupled with the positive potential now appearing at the emitter of the double base diode due to the increased output of signal source 11, will tend to forward bias this diode and cause it to start conducting substantially. Such conduction will tend to lower the potential at the bases and the emitter of double base diode 19. The lowering of the potential at the emitter of double base diode 19 will be reflected at the emitter of transistor 12 through resistor 18. The lower potential at the emitter of transistor 12 will tend to make this transistor conduct more heavily which in turn will lower the potential at the anode of diode 20 and the upper base of double base diode 19 even more.

This cumulative regenerative process will continue so as to rapidly drive both the double base diode 19 and the transistor 12 into saturation. The regenerative action occurs almost instantaneously to produce a rapid change of state of both the transistor and the double base diode from nonconduction to conduction at saturation. This rapid change of state causes a rapid change of voltage across output terminals 21 and 22. The resultant output voltage may be utilized as required to control switching circuitry. The transistor and double base diode will stop conducting as soon as the input voltage falls slightly below the predetermined firing level.

In this manner, a switching signal having a sharp rise time is produced when the input signal reaches a predetermined magnitude. In an operative model of the preferred embodiment of the device of the invention utilizing a 2N335 type transistor and a 2N490 type double base diode, output signals having less than a 10 microsecond rise time are generated in response to D.C. inputs of a predetermined minimum magnitude.

Diode 20 is utilized to compensate for changing conduction characteristics of transistor 12 with temperature variations. Double base diode 19 has its own built-in temperature compensation in that the emitter-base junction has a negative temperature coefficient while the interbase resistance has a positive temperature co-efficient. The use of diode 20 which has a temperature co-efficient opposite to that of transistor 12, in one of the base circuits of double base diode 19, changes the effective current flow through the double base diode with variations in temperature. This effectively changes the bias on transistor 12 in such a manner so as to compensate for varying conduction characteristics of this transistor with temperature variations.

While a NPN type transistor is shown in the illustrated embodiment of the device of the invention, it will be obvious to one skilled in the art that a PNP type transistor can be utilized in place of the NPN type by transposing the emitter and collector connections to provide proper biasing.

The device of this invention provides a highly precise signal voltage threshold detector circuit utilizing inexpensive components and without the necessity for resorting to component selection. A standard commercial transistor may be utilized for transistor 12 in conjunction with a relatively inexpensive double base diode 19. The rapid regenerative action that takes place between transistor 12 and double base diode 19, makes for a sharp rise time in the output signal and a consistent response to an input signal having a predetermined minimum magnitude.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A device of the class described comprising a double base diode having first and second base electrodes and a control electrode, means in series with said base electrodes for back biasing said diode to establish a predetermined potential at said first base electrode, input means for applying an input signal to said control electrode, said means including amplifying means responsive to the conduction of said diode for driving said diode into saturation and output means responsively coupled across said means for back biasing and said second base electrode.

2. A device of the class described comprising a double base diode having first and second base electrodes and a control electrode, means in series with said base electrodes for back biasing said diode to establish a predetermined potential at said first base electrode, input means for applying an input signal to said control electrode, said input means including a transistor, each of said transistor and said double base diode being regeneratively coupled to the other and output means responsively coupled across said means for back biasing and one of said base electrodes.

3. A direct current signal threshold detector comprising a transistor having an emitter electrode, a base electrode, and a collector electrode, a double base diode having two base electrodes and an emitter electrode, one of said emitter and collector electrodes of said transistor being resistively coupled to the emitter of said double base diode, the other of said emitter and collector electrodes of said transistor being resistively coupled to one of the bases of said double base diode, and single common means for biasing both said transistor and said double base diode to cutoff.

4. A direct current signal threshold detector comprising a transistor having an emitter electrode, a base electrode, and a collector electrode, a double base diode having two base electrodes and an emitter electrode, one of said emitter and collector electrodes of said transistor being resistively coupled to the emitter electrode of said double base diode, the other of said emitter and collector electrodes of said transistor being resistively coupled to one of the bases of said double base diode, a direct current power source, resistive impedance means for operatively coupling said power source between the bases of said double base diode, and a pair of output terminals connected between said one of the bases of said double base diode and one of the terminals of said power source.

5. A direct current signal threshold detector comprising a transistor having an emitter electrode, a collector electrode and a base electrode, a double base diode having a pair of base electrodes and an emitter electrode, the emitter of said transistor being resistively coupled to the emitter of said double base diode, the collector of said transistor being resistively coupled to one of the bases of said double base diode, an input signal source coupled to the base of said transistor, and direct current supply means connected between the bases of said double base diode, whereby when the signal from said signal source exceeds a predetermined limit having a predetermined sense, said transistor and said double base diode are driven rapidly into conduction at saturation.

6. A direct current signal threshold detector comprising a transistor having an emitter electrode, a collector electrode and base electrode, a double base diode having a pair of base electrodes and an emitter electrode, one of said emitter and collector electrodes of said transistor being resistively coupled to the emitter of said double base diode, the other of said emitter and collector electrodes of said transistor being resistively coupled to one of the bases of said double base diode, an input signal source coupled to the base of said transistor, a direct current power source, resistive impedance means for connecting said power source between the bases of said double base diode, and output terminals connected between one of the terminals of said power source and said one of the bases of said double base diode whereby when the signal from said signal source exceeds a predetermined limit having a predetermined sense, said transistor and said double base diode are driven rapidly into conduction at saturation.

7. The device as recited in claim 6 and additionally comprising a diode connected between said resistive impedance means and one of the bases of said double base diode.

8. A direct current signal threshold detector for generating an output signal when an input signal reaches a predetermined magnitude and sense comprising a transistor having a collector electrode, an emitter electrode, and a base electrode, a double base diode having a first and second base electrode and an emitter electrode, an input signal source connected to the base electrode of said transistor, a direct current power source, a first resistor connected between the positive terminal of said power source and said second base of said double base diode, one of the collector and emitter electrodes of said transistor being resistively coupled to said second base of said double base diode, the other of the emitter and collector electrodes of said transistor being resistively coupled to the emitter of said double base diode, a fourth resistor connected between said first base of said double base diode and the negative terminal of said power source, and a pair of output terminals connected between said second base of said double base diode and the negative terminal of said power source, whereby when the signal from said signal source exceeds a predetermined limit, the transistor and double base diode will rapidly change state from nonconduction to conduction at saturation.

9. A direct current signal threshold detector for generating an output signal when an input signal reaches a predetermined magnitude comprising a transistor having a collector electrode, an emitter electrode, and a base electrode, a double base diode having a first and second base electrode and an emitter electrode, an input signal source connected to the base electrode of said transistor, a diode, a direct current power source, a first resistor connected between the positive terminal of said power source and the anode of said diode, the cathode of said diode being connected to said second base of said double base diode, a second resistor connected between the collector electrode of said transistor and the anode of said diode, a third resistor connected between the emitter of said transistor and the emitter electrode of said double base diode, a fourth resistor connected between said first base of said double base diode and the negative terminal of said power source, and a pair of output terminals connected between the anode of said diode and the negative terminal of said power source, whereby when the signal from said signal source exceeds a predetermined limit the transistor and double base diode will rapidly change state from nonconduction to conduction at saturation.

10. A signal threshold detector comprising a double base diode having first and second base electrodes and a control electrode, means for establishing a reference potential on said control electrode, a switching device having first and second electrodes for controlling conduction thereof, one of said device electrodes being connected to said diode control electrode and the other of said device electrodes adapted to receive an input signal, means for establishing a bias upon said switching device to prevent conduction thereof until said input signal attains a predetermined relation to said reference potential, and means responsive to conduction of said switching device for varying said reference potential in a sense to maintain conduction of said switching device.

References Cited in the file of this patent

UNITED STATES PATENTS 2,930,996 Chow et al. ------------ Mar. 29, 1960